United States Patent
Glaeser

(10) Patent No.: US 8,442,710 B2
(45) Date of Patent: May 14, 2013

(54) METHOD FOR THE COMPUTER-SUPPORTED CONTROL OF A SHIP

(76) Inventor: Philipp Glaeser, Berlin (DE)

( * ) Notice: Subject to any disclaimer, the term of this patent is extended or adjusted under 35 U.S.C. 154(b) by 0 days.

(21) Appl. No.: 13/303,415

(22) Filed: Nov. 23, 2011

(65) Prior Publication Data

US 2012/0072059 A1   Mar. 22, 2012

Related U.S. Application Data

(63) Continuation of application No. PCT/EP2010/057242, filed on May 26, 2010.

(30) Foreign Application Priority Data

May 26, 2009   (DE) .......................... 10 2009 022 652

(51) Int. Cl.
*G08G 3/02*   (2006.01)
*B63B 49/00*   (2006.01)

(52) U.S. Cl.
USPC .......... 701/21; 34/995.28; 701/470; 701/301; 342/23

(58) Field of Classification Search ...... 701/21
See application file for complete search history.

(56) References Cited

U.S. PATENT DOCUMENTS

| | | | | |
|---|---|---|---|---|
| 3,276,392 A | * | 10/1966 | Cockerell | 104/23.2 |
| 3,754,247 A | * | 8/1973 | Hansford | 342/23 |
| 4,063,240 A | * | 12/1977 | Isbister et al. | 342/21 |
| 4,881,080 A | * | 11/1989 | Jablonski | 342/357.36 |
| 4,939,661 A | * | 7/1990 | Barker et al. | 701/455 |
| 6,314,366 B1 | * | 11/2001 | Farmakis et al. | 701/482 |
| 6,707,414 B2 | | 3/2004 | Van Rees et al. | |
| 6,826,514 B1 | * | 11/2004 | Antico et al. | 702/188 |
| 7,416,458 B2 | * | 8/2008 | Suemori et al. | 440/53 |
| 7,561,886 B1 | * | 7/2009 | Gonring et al. | 455/456.1 |
| 8,098,545 B2 | * | 1/2012 | Rhodes et al. | 367/131 |
| 8,145,369 B1 | * | 3/2012 | Tureaud et al. | 701/21 |
| 2002/0133294 A1 | * | 9/2002 | Farmakis et al. | 701/301 |
| 2003/0137443 A1 | * | 7/2003 | Rees et al. | 342/23 |
| 2004/0064249 A1 | | 4/2004 | Lacey et al. | |
| 2004/0222902 A1 | * | 11/2004 | Wortsmith | 340/932.2 |
| 2007/0017426 A1 | * | 1/2007 | Kaji et al. | 114/144 RE |
| 2007/0073454 A1 | * | 3/2007 | Kaji et al. | 701/21 |
| 2010/0070118 A1 | * | 3/2010 | Yamada et al. | 701/21 |

FOREIGN PATENT DOCUMENTS

| | | |
|---|---|---|
| DE | 198 13 005 | 10/1999 |
| DE | 602 23 721 | 10/2008 |
| DE | 602 33 721 | 10/2008 |
| JP | 11351904 A * | 12/1999 |
| JP | 2000146618 A * | 5/2000 |

OTHER PUBLICATIONS

International Search Report of PCT/EP2010/057242, date of mailing Aug. 9, 2010.
German Patent Office Action in DE 10 2009 022 652.4 dated Dec. 18, 2009, with English translation of relevant parts thereof.
Andree, P. et al., "Bestimmung von Schiffsbewegungen and anderen hochfrequenten Bewegungen mittels GPS" DGON Symposium Ortung + Navigation 2000 (Spec)(ISR).
Gilles, Ernst D. et al, Ein integriertes Navigationssystem für den Binnen-und Küstenbereich, Jan. 1995, pp. 249-254 (ISR).

* cited by examiner

*Primary Examiner* — Shelley Chen
(74) *Attorney, Agent, or Firm* — Collard & Roe, P.C.

(57) ABSTRACT

The positions and motions of a bow and a stern of the ship are detected using redundant devices and evaluated to automatically perform difficult maneuvers in ports or to generate recommendations for controlling the ship.

9 Claims, 2 Drawing Sheets

METHOD FOR THE COMPUTER-SUPPORTED CONTROL OF A SHIP

CROSS REFERENCE TO RELATED APPLICATIONS

Applicant claims priority under 35 U.S.C. §119 of German Application No. 20 2009 022 652.4 filed May 26, 2009. Applicant also claims priority and this application is a continuation under 35 U.S.C. §120 of International Application No. PCT/EP2010/057242 filed May 26, 2010, which claims priority under 35 U.S.C. §119 of German Application No. 20 2009 022 652.4 filed May 26, 2009. The international application under PCT article 21(2) was not published in English. The disclosures of the aforesaid International Application and German Application are incorporated herein by reference.

BACKGROUND OF THE INVENTION

1. Field of the Invention

The invention refers to methods for the computer-supported control of a ship.

2. The Prior Art

Assistance systems helping a ship to automatically stay on a certain course are generally known.

In this context, it can be referred to DE 198 13 005 A1.

From U.S. Pat. No. 4,881,080, it is known to be possible to fit out a vehicle with a GPS device containing two antennas. Thus, the position of the vehicle or its longitudinal axis can be determined very accurately.

The publication P Andree et. al: Determination of ship motions and other highly frequented motions of a ship via GPS, DGON Symposium Positioning+Navigation 2000 (http//www.geop.de/download/dgon2000.pdf) treats the possibility to detect more or less periodic motions of a ship, in order to increase the accuracy of monitoring data, e.g. data from echo sounders. In this context, preference is given to a GPS system containing three GPS antennas arranged in triangular shape.

US 2004/0064249 A1 refers to a method and a device for helping to control a vehicle, in particular also a ship, wherein the possibility of determining a course for a berthing maneuver, in order to support the master, is addressed, too.

SUMMARY OF THE INVENTION

Berthing maneuvers are part of the particularly difficult maneuvers of a ship. For this reason, the invention's task is to create a reliable method for performing them.

This task is solved by the invention's automatically detecting positions and motions of the ship as well as moving or stationary obstacles or factors of instability during berthing maneuvers via redundant means, and via a computer controlling a screen displaying the actual position of the ship relative to obstacles and factors of instability as well as performed or recommended control measures.

The invention is based on the general idea to constantly detect the positions of the bow and stern of a ship relative to an earthed reference system and/or to obstacles and factors of instability and to display them on a screen, so that the respective master of the ship can constantly see the respective situation, including potential hazards, and is able to act immediately during automatically performed maneuvers if need be.

According to a preferred embodiment of the invention, a GPS system with a receiver on the bow and a receiver on the stern is part of the redundant means to detect the positions and motions of the ship. Thus, on the one hand, the position of the ship can be detected very accurately (in the generally known manner). On the other hand, the positioning data from the GPS receiver permit to detect the distance from one GPS receiver to the other and allow comparing it to the actually measured value on the ship. The deviation between the distances detected, based on the GPS data and the real distance, can then be used as a criterion for the quality of the positioning data provided by the GPS system.

If three GPS antennas are arranged on the ship, very small, almost periodic motions can be detected in the known manner if need be. Thus pitching, skidding and rolling motions and similar motions of the ship cannot lead to any errors when detecting the position of the ship relative to the environment.

Preferably, at least one other positioning system permitting to detect the position of the bow and stern of the ship relative to stationary or moving obstacles is intended additionally or alternatively to the GPS system. These positioning systems can be sonar, ultrasound, laser and/or radar systems.

In particular, it can be intended to have distance measurement sensors, for example ultrasonic sensors, arranged as a sensor triad on three measured positions on the ship. This allows detecting the coordinates of obstacles in a coordinate system on the ship with a high level of accuracy, so that when beginning a berthing maneuver, a precise map of the environment of the ship can be generated.

Tracking of the reference system or detection of the motions of the ship can be realized via an inertial navigation device that detects the translation and rotation motions of the ship from the beginning of the maneuver. The position errors caused by integration stay insignificant due to the berthing maneuver's lasting a relatively short time, and can be corrected by using redundant sensors such as a compass, GPS systems etc., preferably by using a Kalman filter. An absolute determination of the position during berth maneuvers is of secondary importance so that a relative reference system in reference to the ship is sufficient to perform a berthing maneuver automatically.

Thus, a map of the environment of the ship can be generated and displayed on a screen, so that the motion space available to the ship is easily discernible. The data collected for the generation of the map can be processed by using a Kalman filter, in order to cut out possible disturbances or measurement errors during data collection.

If the above mentioned GPS systems are available on the ship and a digital map of the respective port is already available, the map of the environment generated via positioning systems on the ship, can, provided it refers to stationary factors in the respective port, be compared to the digital map. Thus, criteria for the quality of the positions of bow and stern detected via GPS receivers can be deduced.

As soon as the environment of the ship is sufficiently well detected, there is a general possibility to automatically lead the ship on an optimal course to a desired place with the support of a computer (with appropriate capacity). In this context, it is again favorable that the invention detects the positioning data of bow and stern, so that it is also possible to follow and perform complicated motions of the ship without delays. In this context, it can be referred to generally known control and drive systems, by means of which a ship cannot only be moved longitudinally, but also transversally, e.g. bow thrusters and Voith Schneider propellers. Such systems also allow traversing the ship.

As soon as the invented assistance system with its positioning systems has assessed that there is sufficient collapsing space for a specified maneuver of the ship, a desired route of the ship is automatically detected and saved. Henceforth, the control and drive systems of the ship are controlled in order to assure that the deviation between the desired and the actual route is or becomes minimal. Such a control of the control and drive system of the ship is generally possible regardless of potential disruptive elements, e.g. currents or wind. The only prerequisite is that the control and drive systems of the ship are sufficiently performing to be able to move the ship against potential disruptive forces relative to an earthed reference system.

Notwithstanding, it is appropriate and intended according to a preferred embodiment of the invention, to at least detect stronger disruptive factors separately to allow presetting the drive and control systems of the ship accordingly, in order to compensate the respective disruptive factors. Thus, potential deviations between the planned and the actual route of the ship are limited to the least possible and the need to regulate is reduced at the same time.

An assistance system communicating with the anemometer can be installed on the ship to measure the wind speed. The wind speed and direction relative to the ship thus detected can then be used by the assistance system to detect the wind speed and direction relative to an earthed reference system, as from the data collected by the GPS system or other positioning systems on the ship, the motion speed and direction of the ship relative to the earthed reference system are ascertainable.

If necessary, potential water currents can also be detected with reference to direction and speed by the assistance system's "knowing" a model of the respective ship and being able to calculate the speed and motion direction of the ship at the respective wind load in an (ideally) still aquatic environment due to the model parameters.

From the deviation between the calculated course or the calculated motion direction and speed in opposition to the actual motion direction and speed, the speed and direction of the current can be detected. As it can be assumed that at least in ports, the water current situations of neighboring places practically do not differ from one another, the current data can be detected before beginning a critical maneuver if need be and then be taken into consideration during the following critical maneuver.

Otherwise, concerning preferred characteristics of the invention, it is referred to the claims and the following explanation of the drawing based on which a preferred embodiment of the invented assistance system is further explained.

Protection is not only claimed for the indicated or displayed combinations of the characteristics, but also for any other combination of the indicated or displayed single characteristics in general.

DETAILED DESCRIPTION OF PREFERRED EMBODIMENTS

Figure 1:
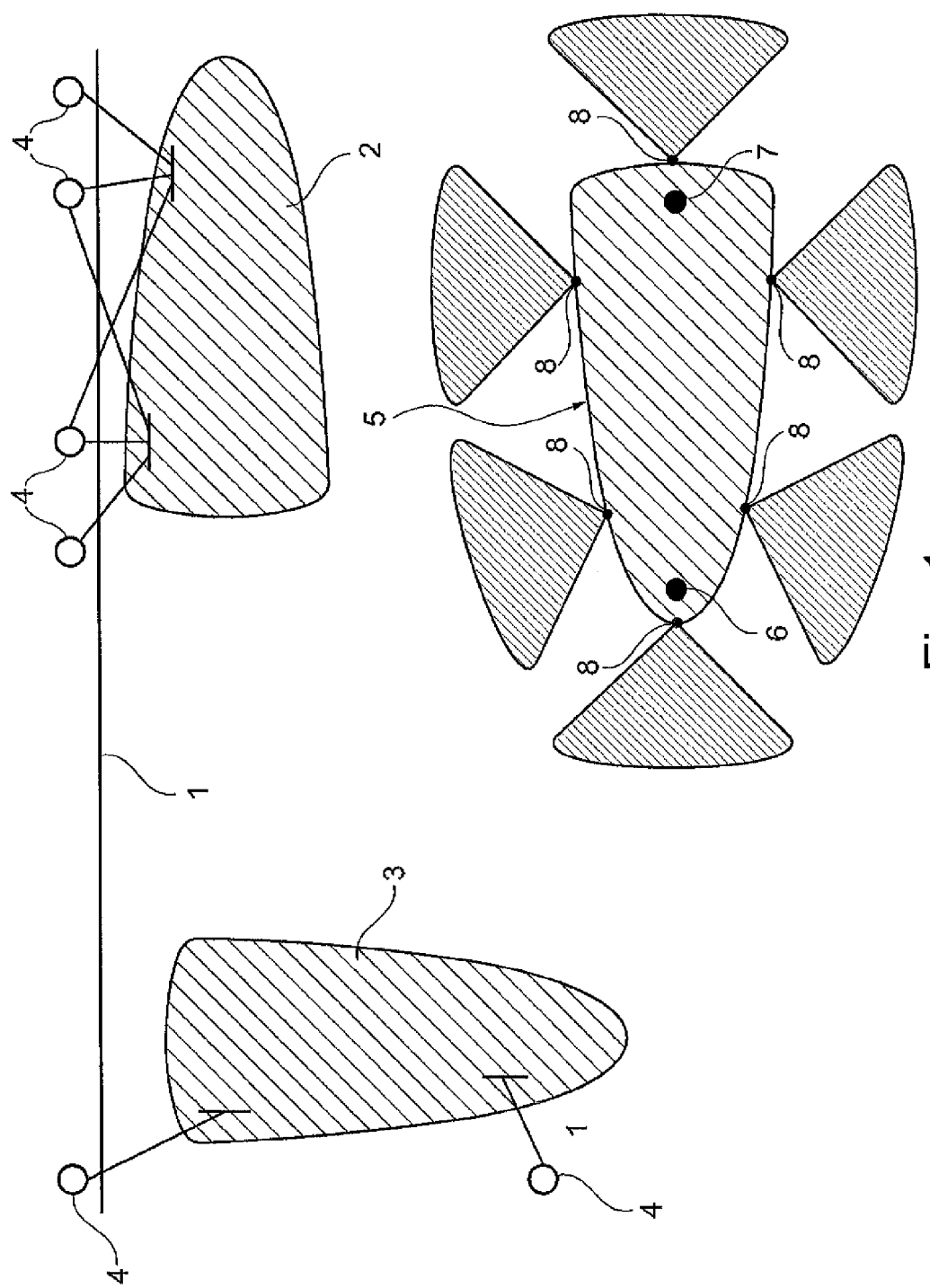
FIG. 1 is a schematic plan view on ships in a section of the port.

FIG. 1 shows an "aerial photograph" of a section of a port with a quay wall 1, on with a ship 2 berthed. Another ship 3 is occupying a couchette berth, wherein the longitudinal axis of ship 3 is vertical to quay wall 1. Both ships 2 and 3 are moored with ropes or cordage on the polders 4. There is still one couchette berth left for another ship 5 between the ships 2 and 3, parallel to ship 3. The other ship 5 may now be equipped with the invented assistance system containing a GPS system with a GPS receiver 6 on the bow and a GPS receiver 7 on the stern. Besides, ship 5 has many positioning systems 8 helping to detect the environment of the ship 5.

Figure 2:
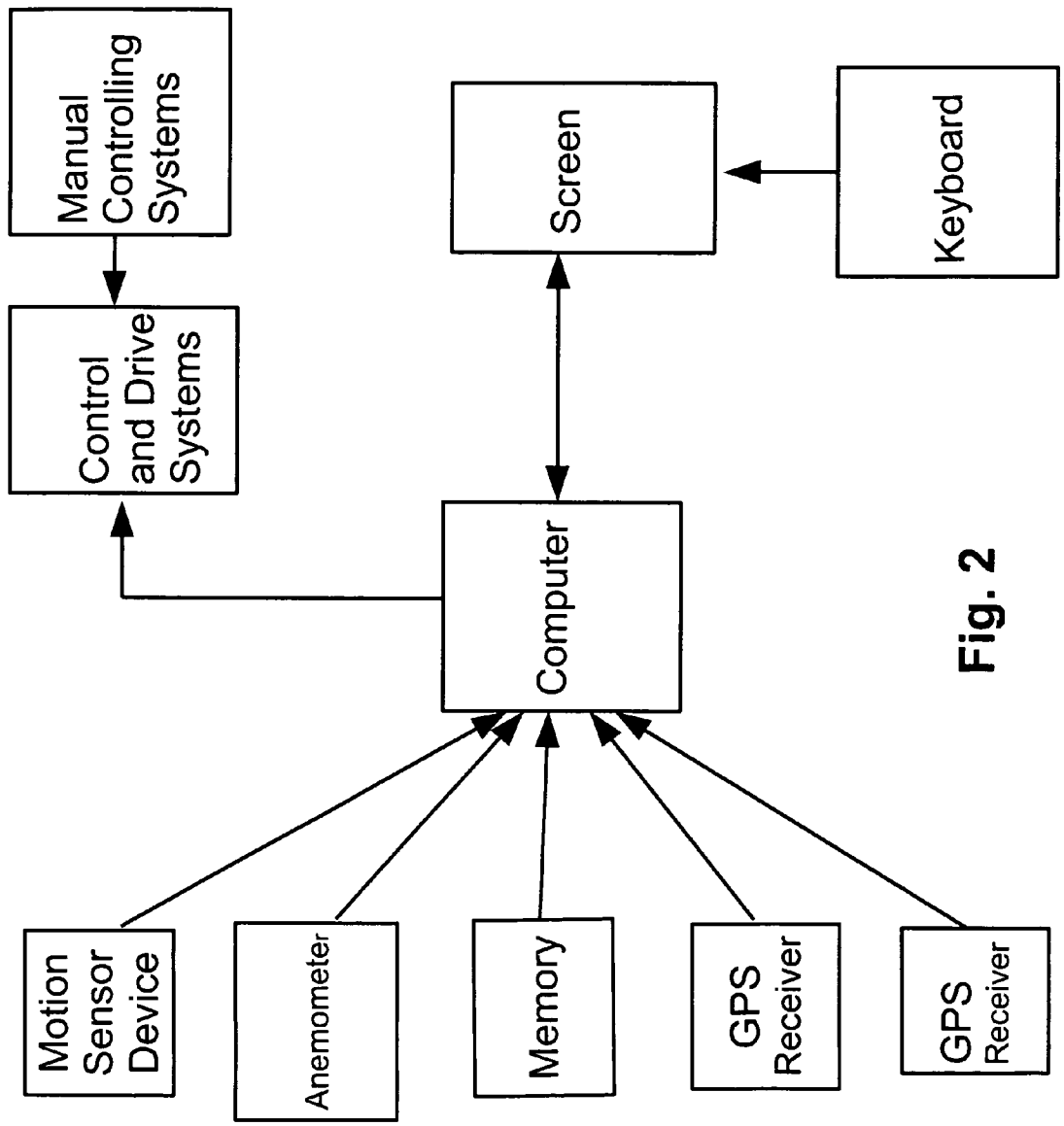
FIG. 2 is a very schematic block display of the invented assistance system.

According to FIG. 2, a computer of the assistance system is connected on the entrance to the GPS receivers. On the outlet, the computer controls at least one screen, which can display the position of the ship 5 based on the data provided by the GPS receivers relative to an earthed reference system, e.g. UTM coordinates (UTM meaning universal transversal Mercator projection). Additionally, on the entrance, the computer can communicate with a memory or a sender or something similar, to obtain the data of a digital map of the respective section of the port.

Thus, the computer can correctly display the position of the ship 5 on the screen relative to the quay wall 1.

If a digital map is not available, the computer can generate a copy of the ship 5 with the environment of the ship on the screen via the data provided by the positioning systems 8.

If the digital map of the port is available, the data provided by the positioning systems 8 are basically only used to correctly "mark" the ships 2 and 3 on the map or the picture of the map displayed on the screen. Generally, the computer checks all data for plausibility or quality. Thus, the data of the GPS receivers allow detecting the distance from one to the other and comparing it to the value determined by design. The bigger the detected distance between the two values gets, the less safe is the position data of bow and stern of the ship 5, detected via GPS receivers. On a screen, this can be reproduced adequately, e.g. by displaying on the one hand the most probable position of the ship 5 and on the other hand a corresponding area of insecurity in which the ship 5 could be, could be reproduced figuratively.

Now, on the screen, a desired target position of the ship 5 can be determined and "communicated" to the computer via a keyboard or a mouse or a similar device. Then, the computer detects an appropriate or optimal desired route so that the ship 5 can reach the target position wherein the computer "bears in mind" the control and drive systems available on board of ship 5. Should these systems not be appropriate or sufficient to perform the necessary maneuvers, this fact is displayed. Thus, the crew obtains a clear piece of advice saying that support of tug and towing vessels or similar vessels has to be solicited. If the control and drive systems are sufficient, on the one hand, there is a possibility to have the necessary maneuvers automatically performed by the computer's operating the control and drive systems of the ship accordingly, i.e. dependant upon a comparison between the desired and the actual value, thus between the detected desired route for the ship 5 and the really taken actual route of ship 5. In order to detect this difference, the signals provided by GPS receivers as well as the signals provided by the positioning systems 8 can be consulted.

In case the ship crew prefers a manual control of the ship, the control systems are operated via manual controlling systems, wherein the orders given by the computer to the control systems are not executed. Nevertheless, the computer can propose appropriate operations of the control and drive systems of the ship on the screen and display at the same time the actual position of the ship 5 as well as the recommendable desired position. This considerably facilitates the crew's control of the ship 5.

Generally, the assistance system can also be of help if the performance of the drive and control systems of the ship 5 alone is not sufficient to perform the maneuvers necessary to reach the desired couchette berth. In this case, the computer can propose appropriate maneuvers for tug and towing vessels or similar vessels, so that the crew is given considerable help when having to give instructions to the crew of the tug and towing vessels.

The computer "knows" a model of the ship 5, so that it can predict the reactions of the ship on interventions on the control and drive systems of the ship in an ideal aquatic environment (particularly without currents). The computer can permanently compare these predicted reactions with the actual reactions of the ship based on the data collected by the GPS receivers and check at the same time whether the deviating reactions can be explained by wind loads, ascertainable based on the data provided by an anemometer connected on the entrance to the computer, that affect the ship 5. The computer then attributes the reactions of the ship that thus cannot be explained to water currents, whose strength and direction is thus ascertainable. This detection of water currents can generally be performed permanently, in particular on time before a special maneuver of the ship 5, so that the influence of currents can be taken into account beforehand when performing an automatic computer-supported maneuver.

It is assumed that the water current situations generally differ only slightly on neighboring positions, i.e. that they are to a great extend constant regardless of their position.

Otherwise, data on water currents and similar data can be transferred fundamentally from a data sender at the port to an appropriate receiving system of the computer 9, e.g. together with a digital map of the respective port.

According to an especially preferred embodiment of the invention, the computer is additionally connected to a motion sensor device, which can detect pitching or skidding motions or similar motions of the ship. If the computer "knows" eventual pitching and skidding motions of the ship, it can thus be avoided that the computer reacts in an undesired manner to the above mentioned motions of the ship when performing an automatic maneuver or detecting recommendable maneuvers. In particular, thus can be avoided causing generally periodic motions of the ship by control measures. There is rather the favorable possibility to absorb periodic motions of the ship by performing control measures in push pull.

The invention can be e.g. resumed as follows:

Via sensors of positioning systems on the ship, the environment of the ship is detected, wherein generally known methods (Kalman filtration) are used to compensate measurement errors. The GPS receivers of the ship are mainly used to determine the course (compass) and to detect the size of the ship. The motion sensors detect motions of the ship in direction of the degrees of freedom and thus allow conclusions as to the strength of the swell. Besides, it can thus be avoided that unnecessary control measures of the ship are performed automatically or are recommended to the crew. After measuring a couchette berth or dock, a desired route for the ship is calculated, wherein the data used for the calculation are preferably corrected by Kalman filtration or similar methods. Based on the desired route, correcting conditions for the control and drive systems of the ship are detected and supplied to it via a CAN bus or a similar procedure. These correcting conditions are permanently updated by comparing the desired with the actual route of the ship.

What is claimed is:

1. Method for the computer-supported control of a ship during berthing maneuvers, the method comprising the steps of:
   automatically detecting via redundant means positions and motions of the ship as well as moving or stationary obstacles or factors of instability;
   comparing a detected distance between a first GPS receiver on a bow of the ship and a second GPS receiver on a stern of the ship detected by the first and second GPS receivers with an actual distance between the first GPS receiver and the second GPS receiver determined by design; and
   controlling via a computer a screen, the screen displaying:
      a most probable position of the ship relative to obstacles and factors of instability;
      a zone of uncertainty in which the ship could be, wherein the zone of uncertainty corresponds to a deviation between the detected distance and the actual distance between the first and second GPS receivers; and
      started or recommended control measures.

2. Method according to claim 1, wherein periodic motions of the ship are substantially detected via an inertia and/or motion sensor.

3. Method according to claim 1, wherein via the computer, saved data of a model of the ship can be used and wherein its reactions on control interventions and determinable ideal conditions can be detected and compared with actual reactions of the ship in order to quantitatively detect disruptive factors.

4. Method according to claim 1, wherein on the screen, it is displayed whether planned or necessary maneuvers can be performed with the available control and drive systems of the ship.

5. Method according to claim 4, wherein via the computer, on the screen are displayed appropriate maneuvers of tug and towing vessels.

6. Method according to claim 1, wherein during manual control of the ship, the computer proposes appropriate operations of the control and drive systems of the ship and displays the actual position as well as a desired position of the ship on the screen.

7. Method according to claim 1, wherein via a minimum of three sensors measuring the distance, attached on measured positions of the ship, obstacles can be detected in a coordinate system on the ship.

8. Method according to claim 7, wherein the motions of the ship are detected by an inertial navigation device as of a starting point when the obstacles were entered into the coordinate system on the ship.

9. Method according to claim 7, wherein motions of the ship are detected via redundant sensors.

* * * * *